United States Patent [19]

Hung et al.

[11] Patent Number: 4,789,959

[45] Date of Patent: Dec. 6, 1988

[54] DELAY CIRCUIT FOR A REAL TIME CLOCK

[75] Inventors: Chuan-Yung Hung; Everett L. Bird, both of San Jose, Calif.

[73] Assignee: Intersil, Inc., Santa Clara, Calif.

[21] Appl. No.: 708,351

[22] Filed: Mar. 5, 1985

[51] Int. Cl.[4] .......................... G06F 1/04; G06M 3/12
[52] U.S. Cl. ...................................... 364/900; 328/72; 377/28; 377/30
[58] Field of Search ... 364/200 MS File, 900 MS File, 364/569; 377/55, 28, 30, 44; 328/55, 58, 63, 72; 307/269

[56] References Cited

U.S. PATENT DOCUMENTS

| | | | |
|---|---|---|---|
| 4,050,062 | 9/1977 | Crocker et al. | 340/183 |
| 4,096,471 | 6/1978 | Agerhall et al. | 340/146.1 R |
| 4,179,747 | 12/1979 | Dlugos | 364/900 |
| 4,303,983 | 12/1981 | Chaborski | 364/569 |
| 4,338,677 | 7/1982 | Morrill, Jr. et al. | 364/900 |
| 4,453,237 | 6/1984 | Reese et al. | 365/222 |
| 4,489,422 | 12/1984 | Paradise et al. | 377/28 |
| 4,494,222 | 1/1985 | White et al. | 365/222 |
| 4,622,668 | 11/1986 | Dancker et al. | 371/20 |

Primary Examiner—Gareth D. Shaw
Assistant Examiner—Jonathan C. Fairbanks
Attorney, Agent, or Firm—S. C. Corwin; H. I. Schanzer; B. E. Morris

[57] ABSTRACT

A delay circuit for a data manipulation circuit is provided in which data update signals to the data manipulation circuit are delayed when a data access signal is present so that data is not manipulated during accessing of the data.

8 Claims, 2 Drawing Sheets

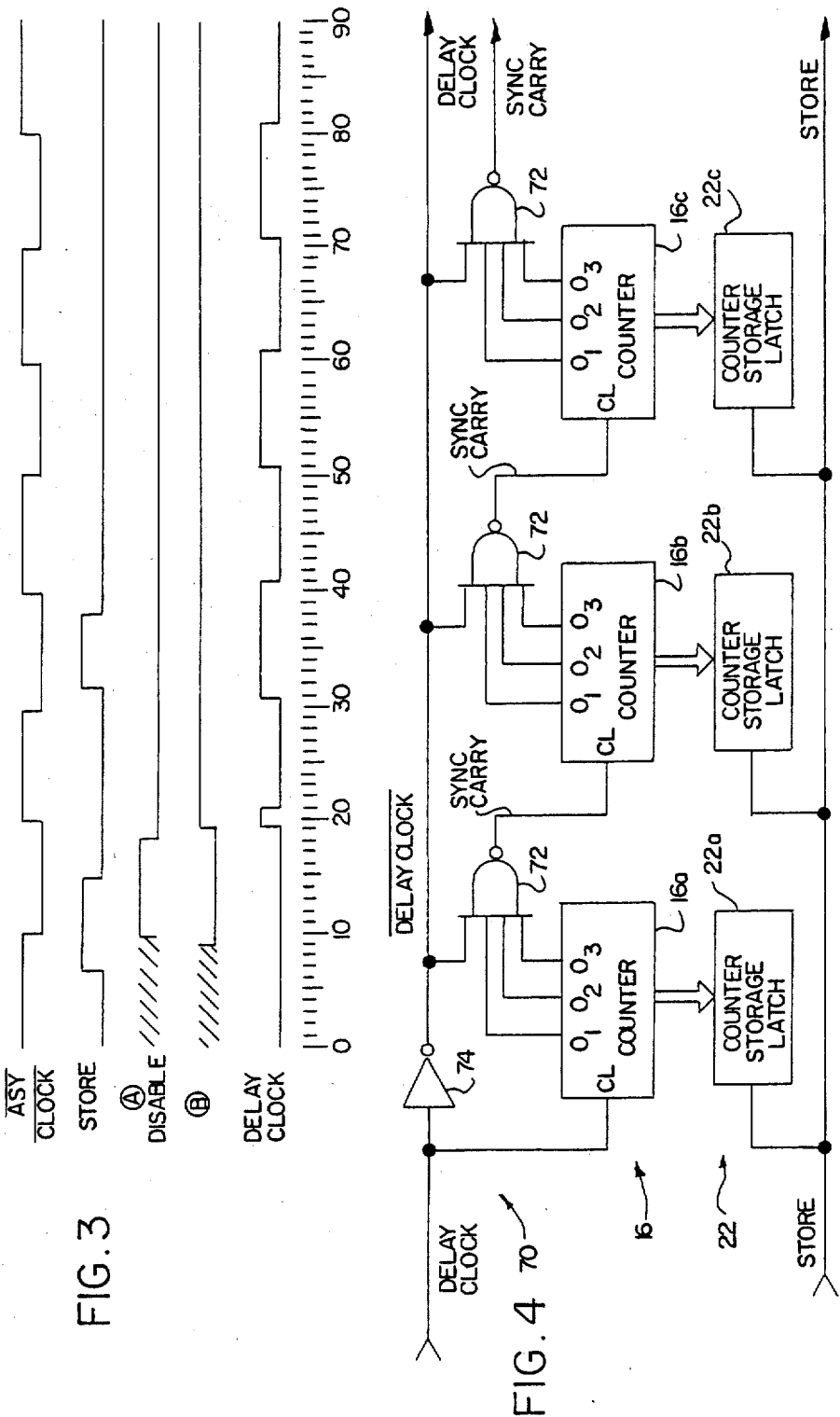

DELAY CIRCUIT FOR A REAL TIME CLOCK

BACKGROUND OF THE INVENTION

1. Field of the Invention

The present invention relates to data manipulation, circuits, and more particularly, to such circuits in which the data is updated and accessed in response to asynchronous signals.

2. Background

Advances in microprocessor circuits have led to increased uses of such circuits in real-time environments. Many real-time applications of microprocessors require the microprocessor to take particular actions in relation to the precise time-of-day or other events.

Circuits for keeping track of the time-of-day are well known in the art and generally include a counter circuit coupled to the output of a clock pulse generator. The clock pulses are generated at a predetermined and generally fixed frequency so that the output of the counter is directly related to the time-of-day.

The clock pulses to the counter circuit are real-time external signals which periodically update the counter output. The counter circuit for such a time-of-day circuit can be considered to be one type of data manipulation circuit which updates or otherwise manipulates data in response to real-time signals or other external events.

Clock pulses are also used by microprocessor circuits to synchronize the operations of the microprocessor. However, clock pulses which are used to time the microprocessor operation are often asynchronous, that is, they are not synchronized with respect to the clock pulses of the time-of-day clock generator. As a consequence, it is possible for the microprocessor to request the time-of-day data while the date is being updated. This can cause the microprocessor to receive erroneous data. Similar types of problems can result with other asynchronous real-time data manipulation circuits.

One method of overcoming this problem is for the microprocessor to conduct multiple reads of the real-time data and to compare the data of the individual read operations to verify the data. Other schemes suggest blocking access by the microprocessor while the data is being updated. Each of these techniques can significantly delay the retrieval of the real-time data by the microprocessor.

BRIEF SUMMARY OF THE INVENTION

It is an object of the present invention to provide an improved data manipulation circuit, obviating, for practical purposes, the above-mentioned limitations.

These and other objects and advantages are achieved in a delay circuit for data manipulation circuits in which asynchronous clock signals or other data update signals are delayed during data access so that the data is not changed while the data is being accessed. In the illustrated embodiment, a delay circuit delays the asynchronous clock pulses to a counter when the counter output is being accessed in response to a data access signal from a microprocessor. In the absence of data accesses by the microprocessor, the asynchronous clock pulses proceed unhindered by the delay circuit to the counter.

In another aspect of the present invention, logic circuitry is provided to eliminate cumulative delays between the stages of the counter. This can ensure that the clock signals updating the counter stages can propagate through all of the stages before the data access is completed.

BRIEF DESCRIPTION OF THE DRAWINGS

FIG. 3 is a timing diagram for the circuit of FIG. 2; and

FIG. 4 is a more detailed schematic diagram of the counter and latch circuits of FIG. 1.

DETAIL OF THE DRAWING

Figure 1:
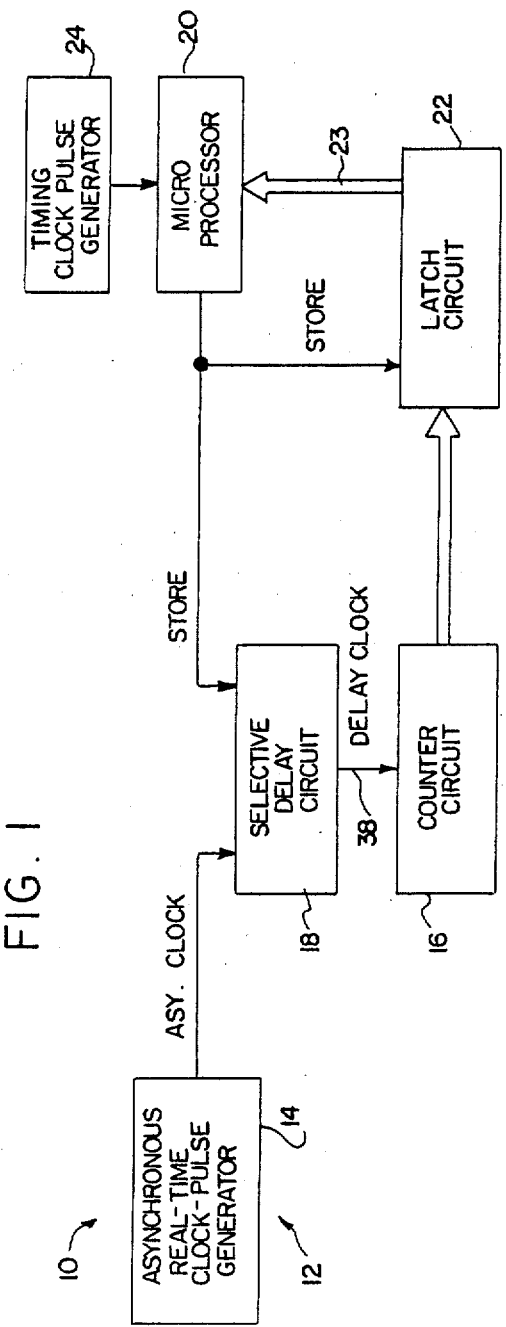
FIG. 1 is a schematic diagram of a computer in a real-time environment employing a preferred embodiment of the present invention.

Referring now to FIG. 1, a computer system employing a preferred embodiment of the present invention is indicated generally at 10. The system 10 includes a time-of-day circuit 12, which in turn comprises an asynchronous real-time clock pulse generator 14. The generator 14 provides a train of clock pulses (designated "ASY. CLOCK") to a data manipulation circuit 15. The data manipulation circuit 15 includes a counter circuit 16 and a selective delay circuit 18 which will be described in greater detail below. The counter circuit 16 counts the clock pulses from the clock pulse generator 14. Because the clock pulses of the clock pulse generator 14 are at a fixed, predetermined frequency, the output of the counter circuit 16 is directly related to the time-of-day.

In the real-time application illustrated in FIG. 1, a microprocessor 20 is programmed to take particular, predefined actions at different times which are defined by the output of the counter circuit 16. Accordingly, the microprocessor 20 periodically reads the output of the counter 16 through a latch circuit 22. In response to a data access signal (designated "STORE") from the microprocessor 20, the latch circuit 22 stores or latches the time-of-day output of the counter circuit 16. This time-of-day data is subsequently read from the latch circuit 22 over the system bus 23.

The operations of the internal circuitry of the microprocessor 20 and various peripheral circuits (not shown) of the computer system 10 are synchronized by clock pulses provided by a timing clock pulse generator 24. In many systems, the clock pulses for timing the operations of the microprocessor 20 are nonsynchronous, that is, asynchronous with respect to the clock pulses of the real-time clock pulse generator 14. Consequently, in absence of the present invention, the output of the counter circuit 16 might be in the process of changing in response to a clock pulse from the pulse generator 14 when the latch circuit 22 stores the counter circuit output in response to a STORE signal from the microprocessor 20. Thus, the latch circuit 22 might, in the absence of the present invention, latch up erroneous data from the counter circuit 16.

In order to prevent such erroneous data reads, the selective delay circuit 18 prevents a clock pulse from the clock pulse generator 14 from reaching the counter circuit 16 if the STORE signal from the microprocessor 20 is active. Immediately after the termination of the STORE pulse from the microprocessor 20, the selective delay circuit 18 inserts a clock pulse at the output 38 to the counter circuit 16. In this manner, the counter circuit 16 is not updated until after the data store operation of the latch circuit 22 is completed. In the absence of a STORE signal from the microprocessor 20, the clock nals $\overline{\text{ASY. CLOCK}}$ from the asynchronous real-time
ck pulse generator 14 pass undelayed through the
ective delay circuit 18 to the delay circuit output 38
 the counter circuit 16.

Figure 2:
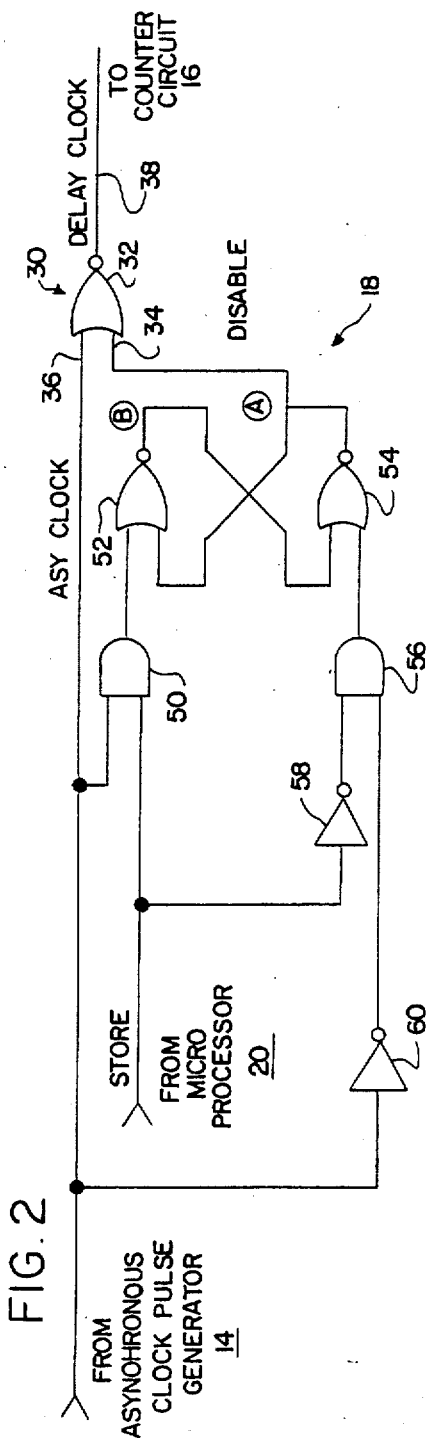
FIG. 2 is a more detailed schematic diagram of the delay circuit of FIG. 1.

FIG. 2 shows a schematic diagram of a more detailed
bodiment of the selective delay circuit 18. The delay
cuit 18 includes a transmission gate 30 which, in the
strated embodiment, comprises a NOR gate 32 hav-
 an enable/disable input 34, for the signal "DIS-
LE," and a second input 36 for the asynchronous
ck signal $\overline{\text{ASY. CLOCK}}$ from the clock pulse gener-
r 14 of FIG. 1. When enabled (i.e., DISABLE is
ctive), the transmission gate 30 transmits the asyn-
onous clock signals $\overline{\text{ASY. CLOCK}}$ to the the
nter circuit 16 unhindered (but inverted) to the out-
line 38. The inverted clock signals on the output 38
 the delay circuit 18 are designated "DELAY
OCK."

he operation of the selective delay circuit 18 of
. 2 will now be described in greater detail in con-
tion with the timing diagram of FIG. 3. For pur-
es of illustration, it is assumed that the initial states
, at time "0") of the real-time clock signal $\overline{\text{ASY.}}$
OCK from the clock pulse generator 14 and the
ORE signal from the microprocessor 20 are inactive.
t is, the $\overline{\text{ASY. CLOCK}}$ signal is at a logical one state
responding to the absence of a clock pulse and the
ORE signal is a logical zero state corresponding to
absence of a STORE pulse. At time increment "7",
STORE signal goes active (logical one) indicating
beginning of a read operation by the microprocest the termination (logical zero) of the STORE
e, the output of the counter 16 is latched by the
h circuit 22. If a clock pulse to the counter circuit 16
e to occur very close to the termination of the
ORE pulse, data could be latched which is in a tran-
ry (and therefore probably useless) state. As de-
ed below, the selective delay circuit 18 eliminates
 possibility by delaying the clock pulses to the
nter 16 if the STORE signal has previously gone
ve.

s shown in FIG. 2, the signal lines of the $\overline{\text{ASY.}}$
OCK signal from the pulse generator 14 and the
ORE signal from the microprocessor 20 are coupled
he inputs of an AND gate 50. As previously men-
ed, both the $\overline{\text{ASY. CLOCK}}$ and STORE signals are
gical one states at time increment "7." One time
ement later, i.e., time increment "8," the output of
AND gate 50 also goes to a logical one state. The
ut "B" of a NOR gate 52 having an input coupled
he output of the AND gate 50 is consequently
ed to a logical zero state one time increment later
e increment "9") regardless of its previous state, as
vn in FIG. 3.

he time increments of FIG. 3 represent the propaga-
 delays of the logic circuitry of FIG. 2. The selec-
 delay circuit 18 may be either synchronous (i.e.,
ked) or asynchronous logic.

third NOR gate 54 has one input coupled to the
ut "B" of the NOR gate 52 and another input cou-
to the output of an AND gate 56. The inputs of the
 gate 56 are coupled by inverters 58 and 60 to the
al lines of the signals STORE and $\overline{\text{ASY. CLOCK}}$,
ectively. Consequently, when the STORE signal
to a logical one state at time increment "7," the
ut "A" of the AND gate 56 goes to a logical zero
. Once the output "B" of the NOR gate 52 is also forced to a logical zero state, the output "A" of the
NOR gate 54 is correspondingly forced to a logical one
state one time increment later (time increment "10") as
shown in FIG. 3.

The output "A" of the NOR gate 54 provides the
DISABLE signal to the enable/disable input 34 of the
NOR gate 32. With the DISABLE signal active (i.e.,
NOR gate 54 output "A" at a logical one state), the
NOR gate 32 is disabled from transmitting (and invert-
ing) the clock signals $\overline{\text{ASY. CLOCK}}$ from the clock
pulse generator 14. Thus, even though the $\overline{\text{ASY.}}$
CLOCK signal goes active (logical zero) at time incre-
ment "10," the DELAY CLOCK signal at output 38 of
the NOR gate 32 remains inactive (logical zero) as
shown in FIG. 3.

Upon termination of the STORE pulse at time incre-
ment "15," the output of the AND gate 56 subsequently
goes to a logical one state so that the output "A" of the
NOR gate 54 is forced to a logical zero state at time
increment "18." Thus, the DISABLE signal goes inac-
tive at time increment "18". In addition, the output "B"
of the NOR gate 52 goes to a logical one state at the
following time increment "19."

Since the DISABLE signal is rendered inactive while
the clock signal $\overline{\text{ASY. CLOCK}}$ is still active (logical
zero), the DELAY CLOCK signal at the output 38 of
the NOR gate 32 goes active at time increment "19,"
thereby inserting a clock pulse after the termination of
the STORE pulse. Upon termination of the clock signal
$\overline{\text{ASY. CLOCK}}$ from the clock pulse generator 14, the
clock pulse DELAY CLOCK terminates one time in-
crement later. In this manner, the clock pulse $\overline{\text{ASY.}}$
CLOCK from the clock pulse generator 14 is delayed
until after termination of the STORE pulse. This en-
sures that the data latched by the latch circuit 22 is not
in transition.

If the STORE pulse is not present when the clock
pulse $\overline{\text{ASY. CLOCK}}$ goes active (logical zero), the
clock pulse is transmitted and inverted without delay
(excepting small clocking or propagation delays of the
gate 32 itself) as the gate 32 signal DELAY CLOCK as
shown at time increments 25-45 of FIG. 3. Specifically,
when the clock signal $\overline{\text{ASY. CLOCK}}$ goes active at
time increment 30, the STORE signal from the micro-
processor remains inactive (logical zero). Conse-
quently, the outputs of the AND gate 50 and NOR gate
52 remain unchanged. Although the output of the AND
gate 56 does go to a logical one state upon the transition
of the signal $\overline{\text{ASY. CLOCK}}$ at time increment "30", the
output "A" of the NOR gate 54 remains unchanged
(logical zero) since the output of the NOR gate 52 re-
mains at a logical one state. Thus, the DISABLE signal
remains inactive allowing the clock pulses $\overline{\text{ASY.}}$
CLOCK to be transmitted and inverted by the NOR
gate 32.

Should the STORE signal become active after the
clock pulse $\overline{\text{ASY. CLOCK}}$ becomes active, as indicated
at time increment "32", this will have no effect on the
output of the NOR gate 32. The DISABLE signal re-
mains inactive because the output states of the AND
gate 50 (logical zero) and NOR gate 52 (logical one)
remain unchanged so that the DISABLE signal output
of the NOR gate 54 also cannot change, remaining at
logical zero. Time increments 43 et. seq. show that the
clock pulses $\overline{\text{ASY. CLOCK}}$ proceed unhindered
through the transmission gate 32 to be inverted to the
clock pulses DELAY CLOCK in the absence of the
STORE signals.

In the illustrated embodiment, the duration of the STORE pulse should be less than the duration of the pulses of the clock signal $\overline{\text{ASY. CLOCK}}$ to allow insertion of a clock pulse after the STORE pulse should the STORE pulse precede the clock pulse $\overline{\text{ASY. CLOCK}}$.

FIG. 4 shows a more detailed embodiment of the counter circuit 16 and latch circuit 22 of FIG. 1. The counter circuit 16 includes a plurality of 3-bit counter stages 16a, 16b, 16c... and synchronous carry logic 70 which ensures that the clock signal $\overline{\text{DELAY CLOCK}}$ from the selective delay circuit 18 propagates completely through all of the counter stages 16a, 16b, 6c... well within the width of the STORE strobe.

The carry logic 70 includes a plurality of NAND gates 72, each of which has three inputs coupled to the three bit output $O_1$–$O_3$ of an associated three-bit counter stage 16a–16c. Each NAND gate 72 has a fourth input coupled to the signal line $\overline{\text{DELAY CLOCK}}$ which is coupled to the delay circuit output 38 by an inverter 74. The output of each NAND gate 72 (designated "SYNC. CARRY") is coupled to the clock input of the next counter stage.

The NAND gates 72 are provided to detect when the associated counter stage is ready to overflow (i.e., all outputs equal to logical one). Accordingly, after a particular 3-bit counter stage reaches the output of "111", upon termination of the clock pulse ($\overline{\text{DELAY CLOCK}}$ equal to logical one), the output of the associated NAND gate 72 goes to a logical zero state. On the next transition of the clock signal $\overline{\text{DELAY CLOCK}}$, the NAND gate output switches back to a logical one state, thereby clocking the subsequent counter stage on the transition of the clock pulse (or $\overline{\text{DELAY CLOCK}}$ (or DELAY CLOCK) and not on the transition of the associated counter output. As a result, the carry logic 70 synchronizes the SYNC. CARRY signal to the individual counter stages to the clock signal DELAY CLOCK. Therefore, all the counter stages clock in parallel rather than rippling the output of the counter stages through each stage serially. As a result, the worst case delay before the data update is complete is a function of the individual counter stages and not the cumulative serial delay of all the counter stages.

It will, of course, be understood that modifications of the present invention, in its various aspects, will be apparent to those skilled in the art, some being apparent only after study others being merely matters of routine electronic design. For example, the delay circuit shown herein may also be used with other types of data manipulation circuits which update data in response to asynchronous input signals. Other embodiments are also possible with their specific designs dependent upon the particular application. As such, the scope of the invention should not be limited by the particular embodiment herein described but should be defined only by the appended claims and equivalents thereof.

What is claimed is:

1. A real-time clock circuit for providing clock pulses to a counter circuit wherein a latch circuit latches the output of the counter circuit in response to a store signal; the clock circuit comprising clock pulse means, for transmitting the clock pulses from the clock pulse means for generating a periodic clock pulse; and transmission means, coupled to the output of the clock pulse means to the counter circuit and for storing the occurrence of a clock pulse and delaying the transmission of a clock pulse when a store signal is present until after the termination of the store signal; and wherein said counter circuit includes a plurality of counter stages, each counter stage having a toggle input and an output means, wherein said counter circuit includes synchronization and clocking means coupled between the output means of each counter stage and the toggle input of the succeeding counter stage, and wherein said synchronization and clocking means is responsive to the signal transmitted by said transmission means for applying signals to the toggle inputs of the counter stages in synchronism with the signals transmitted by said transmission means.

2. A clock circuit comprising:
a clock pulse generator for generating clock pulses;
a counter having a clock signal input, for counting the clock pulses of the clock pulse generator;
a latch circuit responsive to a latch signal, for latching the output of the counter;
a first NOR gate having a first input coupled to the output of the clock pulse generator, and a second input, and an output coupled to the clock signal input of the counter;
a first AND gate having an input coupled to the output of the clock pulse generator and a second input for the latch signal;
a second NOR gate having a first input coupled to the output of the first AND gate, and a second input, and an output;
a third NOR gate having a first input coupled to the output of the second NOR gate, and a second input, and an output coupled to the second input of the second NOR gate and also to the second input of the first NOR gate; and
a second AND gate having a first input and a first inverter for coupling the latch signal to the first input of the second AND gate and a second input having a second inverter for coupling the output of the clock pulse generator to the second input of the AND gate, and an output coupled to the second input of the third NOR gate.

3. A timing circuit comprising:
a source of regularly occurring input pulses to be counted;
a plurality of counters for counting said regularly occurring input pulses, each counter having a toggle input to which is applied a counting pulse and a counter output;
synchronization and clocking means interconnecting and operating said plurality of counters in series and coupling the counter output of each preceding counter to the toggle input of the next succeeding counter in the series;
read-out means coupled to said counters responsive to a read-out command for selectively reading out their contents;
control means responsive to said read-out command and to said regularly occurring input pulses for:
(a) normally applying said regularly occurring input pulses with little, if any, delay to the toggle input of the first counter of said counters connected in series in the absence of a read-out command; and
(b) delaying the application of said regularly occurring input pulses to the toggle input of said first counter when said read-out command is present; and
said synchronization and clocking means being responsive to selected counter outputs of each preceding counter and to a timing pulse derived from aid control means for applying a counting pulse to the toggle input of the counter succeeding said preceding counter in synchronism with said derived timing pulse.

A timing circuit as claimed in claim 3 wherein said control means includes a set/reset flip flop having a set, a reset input and a Q output, first and second AND'ing type gate and a NOR type gate;

wherein said regularly occuring input pulses and said read-out command are applied to the inputs of said first AND'ing type gate and the output of said first AND'ing type gate is connected to said set input;

wherein the inverse of said regularly occurring input pulses and of said read-out command are applied to the inputs of said second AND'ing type gate and the output of said second AND'ing type gate is connected to said reset input; and wherein said regularly occurring input pulses and said Q output are applied to the inputs of said NOR type gate and wherein the output of said NOR type gate is applied to the toggle input of said first counter.

The timing circuit as claimed in claim 3 wherein source of regularly occurring input pulses is a real clock; and wherein said read out means includes a microprocessor.

The timing circuit as claimed in claim 3 wherein readout means includes a latch circuit connected to counter for storing the contents of its associated counter in response to a read out command.

In combination with a real time clock comprised of cillator producing regularly occurring timing signals applied to a count down chain and including reading means producing read signals coupled to the count down chain for selectively reading the contents of sections of the count down chain asynchronously with respect to said regularly occurring timing signals whereby an erroneous read-out of the contents of the count down chain can occur as a result of a timing signal being generated during a read-out of the contents of the count down chain, the improvement comprising:

control means responsive to said read signal coupled at its input to said oscillator and at its output to said count down chain for:
(a) in the absence of said read signal normally coupling said regularly occurring timing signals to said count down chain with substantially no delay, and
(b) in the presence of said read signal delaying the application of said regularly occurring timing signal to the count down chain during the occurrence of said read signal; and wherein said count down chain includes a plurality of counters, each counter having a toggle input and an output means, and synchronization and clocking means coupled between the output means of one counter and the toggle input of the succeeding counter along the chain, said synchronization and clocking means being responsive to the signal at the output of said control means and to the output of each counter along the chain for applying a signal to the toggle input of the succeeding counter along the chain in synchronism with the signal at the control means output.

8. The improvement as claimed in claim 7 wherein said reading means is a microprocessor.

* * * * *